Sept. 3, 1929.   T. M. EYNON   1,726,549
LIQUID LEVEL INDICATOR
Filed March 31, 1921
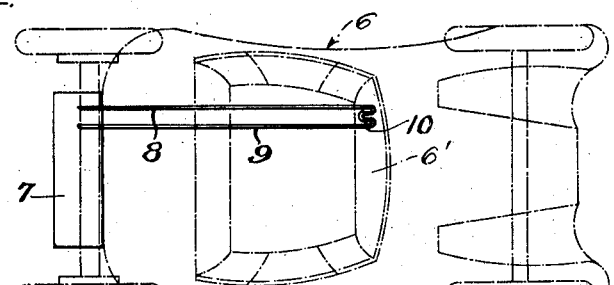
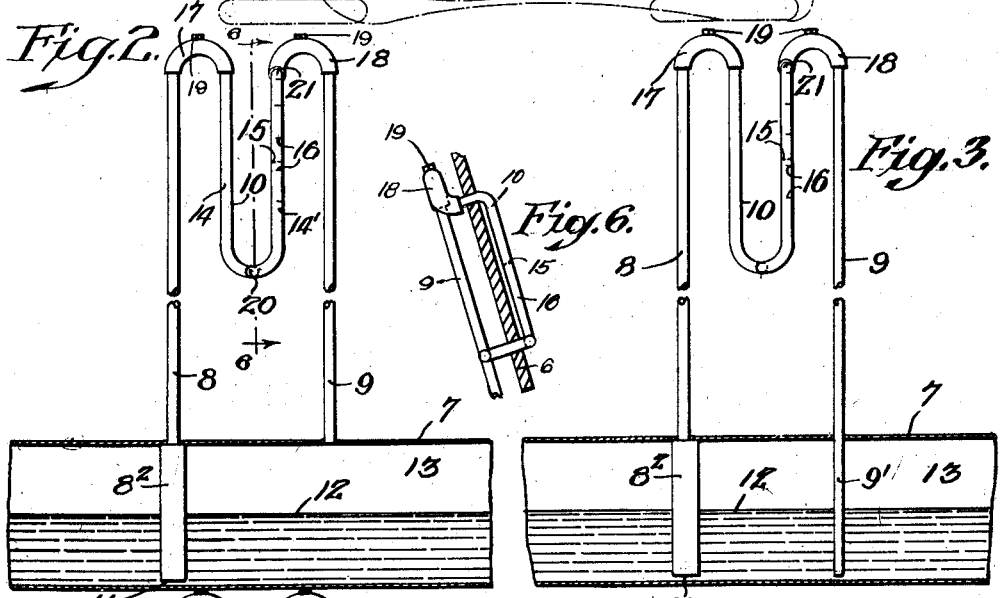
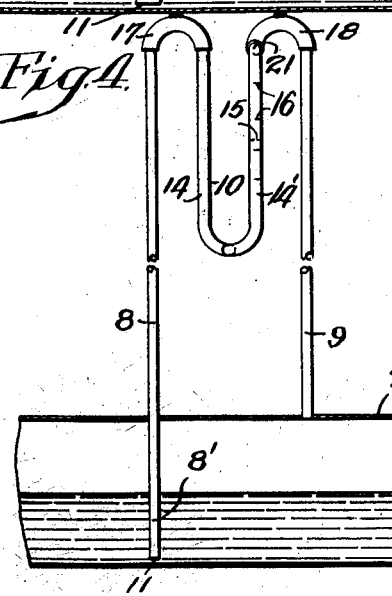
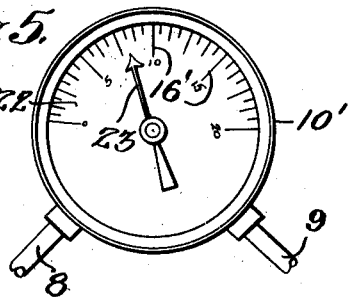
Inventor.
Thomas M. Eynon
by
Attorney.

Patented Sept. 3, 1929.

1,726,549

UNITED STATES PATENT OFFICE.

THOMAS M. EYNON, OF PHILADELPHIA, PENNSYLVANIA.

LIQUID-LEVEL INDICATOR.

Application filed March 31, 1921. Serial No. 457,279.

My invention relates to indicators intended to show at the automobile dash board the depth of gasoline in the automobile tank.

The purpose of my invention is to conduct fluid pressure from the tank to the dash by means of air and vapor trapped by the gasoline and made effective by it.

A further purpose is to connect a U tube or other air operated pressure indicator with the bottom of the tank at one side and with the vapor space of the tank at the other, in order to indicate the differences in pressure represented by the gasoline depth and to eliminate the effect of pressure variations in the vapor space.

Further purposes will appear in the specifications and in the claim.

I have preferred to illustrate my invention by but one general form, though differing in detail, selecting a form which is simple, practical, efficient and inexpensive and which at the same time well illustrates the principles of my invention.

Figure 1 is a top plan view of an automobile in outline to which my invention is applied largely in diagrammatic form.

Figures 2, 3 and 4 are longitudinal sections of a tank with elevations of a U tube indicator to which my invention may be applied.

Figure 5 is a front elevation of a different form of indicator.

Figure 6 is a section taken on the line 6—6, Figure 2 showing the dashboard in full lines.

In the drawings similar numerals indicate like parts.

When a pipe which is closed except at its lower end is immersed in a liquid the pressure of air in the pipe will be influenced by the weight of the column of liquid above the pipe opening. As the depth of immersion increases the pressure per square inch of air in the pipe is accordingly increased, and vice versa. I have applied this principle to automobile indicators, maintaining the position of the tube within the tank and using the height of gasoline in the tank as depth of immersion.

The automobile 6 is shown as provided with a dashboard 6', a tank 7, which is connected by pipes 8 and 9 with an indicator 10. The pipe 8 extends to the bottom of the tank as at 11 where it is open and is immersed to varying degrees by gasoline 12, the pressure upon the air trapped in the pipe will increase with the height of the gasoline i. e. with the depth of immersion.

In Figure 4 the immersible part of the pipe 8 is shown as of the same diameter as at 8', while in Figures 2 and 3 the diameter of this section $8^2$ is increased with a view to increasing the volume of that portion whose content is varied by reason of gasoline depth fluctuation. This increase of volume may be made to compensate to any extent desired for compression of the air.

In order to eliminate variations in pressure within the vapor space 13 of the gas tank, I use an indicator having double connection with the tank, whose indication is therefore unchanged by increase or reduction of pressure simultaneously in both pipes.

In Figures 2, 3 and 4 the indicator 10 is of U tube type having legs 14 and 14' of the U for liquid 15, showing upon indications 16. The legs are connected respectively with pipes 8, 8' or $8^2$, and 9 through any suitable fittings 17 and 18. These fittings may contain filling openings closed by plugs 19 for the purpose of initial adjustment of the zero point. These fittings also permit metal piping to be connected with a glass U tube indicator.

The indicating leg 14' of each of the U tubes is preferably projected to the face of the dash while the pipe and the other leg 14 of the U are protected by the dash. This is accomplished by staggering or diverting the U forwardly at 20 and oppositely staggering or diverting the fitting 18 at 21.

Figures 2, 3 and 4 are intended to differ in the connection with the tank and in this connection only. In Figure 2 the extension $8^2$ is increased in diameter as compared with the size of the pipe 8 and the pipe 9 terminates within the vapor space of the tank. This gives a large volume of air and vapor within the enlarged part $8^2$ as compared with the air in the pipe 8; so that the height of the gasoline in the tank forces out a relatively large quantity of air and vapor into the pipe, compressing the air therein and giving a full volume of air to move the liquid within the U tube. The pressure in the left hand part of the system will agree substantially with the pressure theoratically due to the existing gasoline height in the tank. Since the pressure in the right hand part of the system is that of the vapor space only, full effect will be given to the additional pressure in the left hand part thereof.

The form in Figure 3 is effective notwithstanding that I regard it as inferior to that in Figure 2. They differ in that pipe 9 is extended at 9' to the bottom of the tank so that the air and vapor in pipe 9 are subject to the same pressure of gasoline as those in pipe 8. However, in Figure 3 the additional volume of air in the left hand part of the system nevertheless causes some movement of the liquid in the U tube before the parts come to equilibrium with an equal amount of compression in each of the pipes 8 and 9.

Notwithstanding the disadvantage from one standpoint, as indicated, in the form shown in Figure 3, there is also an advantage. While it has little effect upon the accuracy of reading, which is improved by the differences in size of the pipe $8^2$ as compared with the pipe 9, with or without the extension 9', the extension 9' gives a back pressure upon the indicating side of the U tube reducing the range of movement. In some locations the reduction in range is very desirable.

In Figure 4 the extension 8' is of the same size as the pipe 8, the conditions being otherwise the same as in Figure 2.

In Figure 2 I obtain the advantage of both the additional pressure and additional volume of air in the left hand part of the system; the form in Figure 3 uses the additional quantity of air compressed in the left hand side of the system without the additional pressure feature; and the form in Figure 4 uses the additional pressure without a differential rate of air compression.

In all of them, starting with an empty tank, the liquid in the U tube should be at the zero point. As gasoline is filled into the tank, the column of gasoline within the terminal 8' or $8^2$ rises with the gasoline in the tank and the air and vapor trapped within the pipe 8 in the left hand side of the system (in the illustration) forces down the liquid in the U tube, causing it to rise in the indicating leg 14' against the lesser pressure admitted through pipe 9.

The difference in pressure in the two pipes may be shown by some other form of differential pressure indicator, such as that shown in Figure 5 which is intended to represent a well known type of dial differential pressure indicator 10' having graduations 16', dial 22 and indicating needle 23.

In all cases the purpose of pipe 9 is to protect against variation in the indication such as would otherwise arise from variant pressure conditions in the vapor space of the tank; and where such variations of pressure are not contemplated, this pipe can be omitted and the indicators shown may be connected with the atmosphere at the right hand side or a single-pressure indicator of any type may be used.

It will be obvious that all or a part of my invention may be presented in other forms, as appeals to the whim or need of those skilled in the art; and it is my purpose to include all such forms within my invention as come within its reasonable spirit and scope.

Having thus described my invention, what I claim as new and desire to secure by Letters Patent is:

In an automobile dash-board indicator for gasoline depth, a gasoline tank, a U-tube adapted for mounting upon such dash-board and having laterally spaced legs connected at the bottom and diverging, one leg of the tube lying in front of and the other behind the dash-board and the one lying in front of the dash-board being connected through the dash-board with the other leg by passages at the top and bottom transverse to the dash-board, in combination with fittings in position back of the dash-board connecting with the two legs at one end of each fitting and with the tank at the other end of each fitting.

THOMAS M. EYNON.